United States Patent
Seo

(10) Patent No.: US 10,194,435 B2
(45) Date of Patent: Jan. 29, 2019

(54) METHOD AND APPARATUS FOR TRANSMITTING DISCOVERY SIGNAL FOR DEVICE-TO-DEVICE DIRECT COMMUNICATION IN WIRELESS COMMUNICATION SYSTEM

(71) Applicant: LG ELECTRONICS INC., Seoul (KR)

(72) Inventor: Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

(21) Appl. No.: 14/771,107

(22) PCT Filed: Apr. 2, 2014

(86) PCT No.: PCT/KR2014/002838
§ 371 (c)(1),
(2) Date: Aug. 27, 2015

(87) PCT Pub. No.: WO2014/163396
PCT Pub. Date: Oct. 9, 2014

(65) Prior Publication Data
US 2016/0014774 A1    Jan. 14, 2016

Related U.S. Application Data

(60) Provisional application No. 61/807,737, filed on Apr. 2, 2013, provisional application No. 61/828,197, filed
(Continued)

(51) Int. Cl.
*H04J 3/00* (2006.01)
*H04W 72/04* (2009.01)
(Continued)

(52) U.S. Cl.
CPC ....... *H04W 72/0446* (2013.01); *H04L 5/0037* (2013.01); *H04L 5/0044* (2013.01); *H04W 76/14* (2018.02); *H04L 5/0053* (2013.01)

(58) Field of Classification Search
CPC .. H04W 72/0446; H04W 84/12; H04W 84/18
See application file for complete search history.

(56) References Cited

U.S. PATENT DOCUMENTS

2007/0201423 A1    8/2007  Laroia et al.
2008/0075145 A1    3/2008  Balachandran et al.
(Continued)

FOREIGN PATENT DOCUMENTS

CN    101690038 A    3/2010
CN    102334370 A    1/2012
(Continued)

OTHER PUBLICATIONS

Asustek, "Method of resource allocation for D2D discovery," 3GPP TSG RAN WG1 Meeting #74bis, R1-134638, Guangzhou, China, Oct. 7-11, 2013, pp. 1-9.
(Continued)

*Primary Examiner* — Siren Wei
(74) *Attorney, Agent, or Firm* — Birch, Stewart, Kolasch & Birch, LLP

(57) ABSTRACT

Disclosed is a method for performing, by a device, device-to-device direct communication in a wireless communication system. In particular, the method comprises the steps of: transmitting a device-to-device direct communication signal via a first resource block having a resource structure for device-to-device direct communication at a first point in time; and transmitting the device-to-device direct communication signal via a second resource block having a resource structure for the device-to-device direct communication at a second point in time, wherein the first resource
(Continued)

block and the second resource block are defined by a time unit index and a resource unit index, respectively, and wherein the time unit index of the second resource block is determined on the basis of the resource unit index of the first resource block index, and the resource unit index of the second resource block is determined on the basis of the time unit index of the first resource block index.

8 Claims, 15 Drawing Sheets

Related U.S. Application Data on May 29, 2013, provisional application No. 61/912,529, filed on Dec. 5, 2013.

(51) Int. Cl.
  *H04W 76/14* (2018.01)
  *H04L 5/00* (2006.01)

(56) References Cited

U.S. PATENT DOCUMENTS

| | | |
|---|---|---|
| 2009/0010231 A1 | 1/2009 | Laroia et al. |
| 2009/0010232 A1 | 1/2009 | Laroia et al. |
| 2009/0016249 A1 | 1/2009 | Li et al. |
| 2009/0016250 A1 | 1/2009 | Li et al. |
| 2009/0016353 A1 | 1/2009 | Li et al. |
| 2010/0110929 A1* | 5/2010 | Li et al. ............... H04B 1/7143 370/254 |
| 2010/0190459 A1* | 7/2010 | Li et al. ............... H03G 3/3078 455/234.1 |
| 2013/0010661 A1* | 1/2013 | Esteves ................ H04B 1/713 370/310 |
| 2013/0051277 A1 | 2/2013 | Hakola et al. |
| 2013/0094480 A1 | 4/2013 | Lim et al. |
| 2016/0255569 A1 | 9/2016 | Harada et al. |

FOREIGN PATENT DOCUMENTS

| | | |
|---|---|---|
| JP | 2009-523384 A | 6/2009 |
| JP | 2010-533429 A | 10/2010 |
| JP | 2010-533430 A | 10/2010 |
| JP | 2010-533432 A | 10/2010 |
| JP | 2010-534422 A | 11/2010 |
| JP | 2012-57974 A | 3/2012 |
| KR | 10-2008-0092947 A | 10/2008 |
| KR | 10-2009-0053925 A | 5/2009 |
| KR | 10-2010-0038222 A | 4/2010 |
| KR | 10-2011-0083719 A | 7/2011 |
| WO | WO 2014/130158 A1 | 8/2014 |
| WO | WO 2015/064442 A1 | 5/2015 |

OTHER PUBLICATIONS

NTT Docomo, Inc., "Views on D2D discovery resource allocation," 3GPP TSG RAN WG1 Meeting #75, R1-135522, San Francisco, USA, Nov. 11-15, 2013, pp. 1-4.

\* cited by examiner

FIG. 2
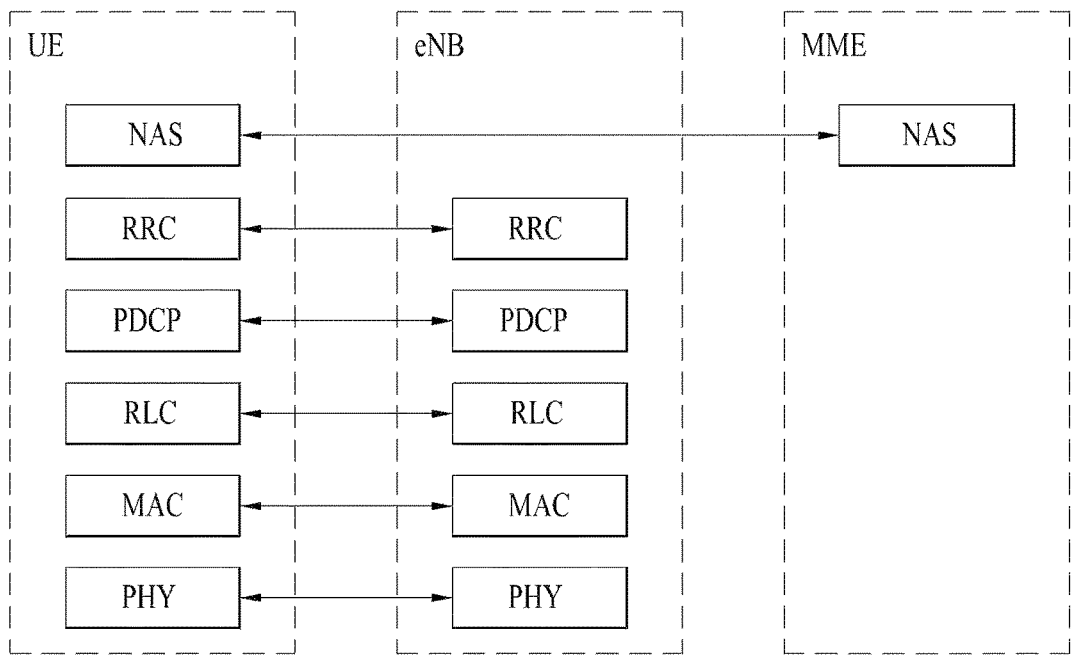
(a) control plane protocol stack
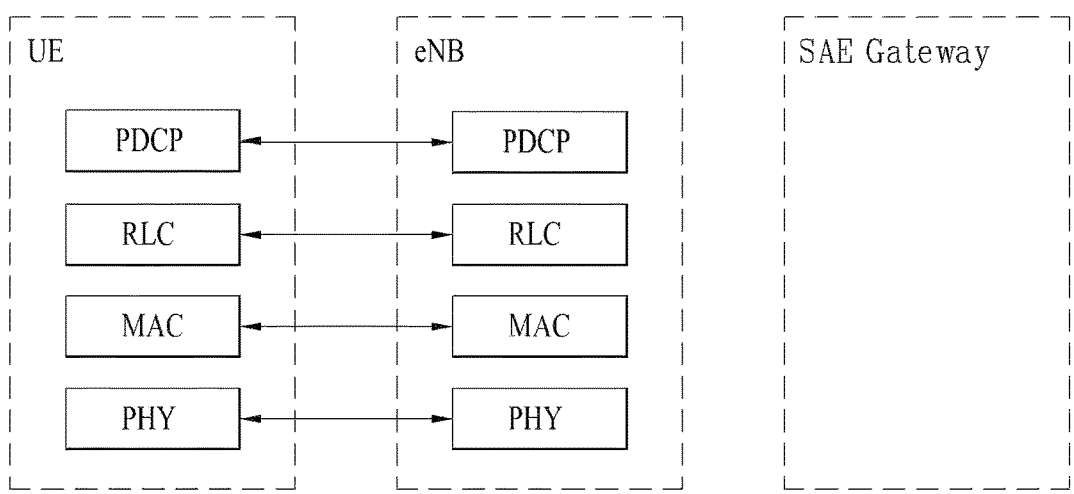
(b) user plane protocol stack

FIG. 13

FIRST DISCOVERY RESOURCE STRUCTURE    SECOND DISCOVERY RESOURCE STRUCTURE

RESOURCE UNIT ↑

| 4 | 9 | 14 | 19 | 24 |
|---|---|----|----|----|
| 3 | 8 | 13 | 18 | 23 |
| 2 | 7 | 12 | 17 | 22 |
| 1 | 6 | 11 | 16 | 21 |
| 0 | 5 | 10 | 15 | 20 |

| 20 | 21 | 22 | 23 | 24 |
|----|----|----|----|----|
| 15 | 16 | 17 | 18 | 19 |
| 10 | 11 | 12 | 13 | 14 |
| 5  | 6  | 7  | 8  | 9  |
| 0  | 1  | 2  | 3  | 4  |

TIME UNIT →

FIG. 14

FIRST DISCOVERY RESOURCE STRUCTURE    SECOND DISCOVERY RESOURCE STRUCTURE

RESOURCE UNIT ↑

| 4 | 9 | 14 | 19 | 24 |
|---|---|----|----|----|
| 3 | 8 | 13 | 18 | 23 |
| 2 | 7 | 12 | 17 | 22 |
| 1 | 6 | 11 | 16 | 21 |
| 0 | 5 | 10 | 15 | 20 |

| 24 | 20 | 21 | 22 | 23 |
|----|----|----|----|----|
| 19 | 15 | 16 | 17 | 18 |
| 14 | 10 | 11 | 12 | 13 |
| 9  | 5  | 6  | 7  | 8  |
| 4  | 0  | 1  | 2  | 3  |

TIME UNIT →

METHOD AND APPARATUS FOR TRANSMITTING DISCOVERY SIGNAL FOR DEVICE-TO-DEVICE DIRECT COMMUNICATION IN WIRELESS COMMUNICATION SYSTEM

CROSS REFERENCE TO RELATED APPLICATIONS

This application is the National Phase of PCT/KR2014/002838 filed on Apr. 2, 2014, which claims priority under 35 U.S.C. 119(e) to U.S. Provisional Application Nos. 61/807,737 filed on Apr. 2, 2013; 61/828,197 filed on May 29, 2013; and 61/912,529 filed on Dec. 5, 2013, all of which are hereby expressly incorporated by reference into the present application.

TECHNICAL FIELD

The present invention relates to a wireless communication system and, more particularly, to a method and apparatus for transmitting a discovery signal for device-to-device (D2D) communication in a wireless communication system.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a method and apparatus for transmitting a discovery signal for device-to-device (D2D) communication in a wireless communication system.

Technical Solution

The object of the present invention can be achieved by providing a method of performing device-to-device (D2D) communication at a user equipment (UE) in a wireless communication system including transmitting a D2D signal via a first resource block of a resource structure for D2D communication at a first timing and transmitting the D2D signal via a second resource block of the resource structure for D2D communication at a second timing, wherein each of the first resource block and the second resource block is defined by a time unit index and a resource unit index, wherein the time unit index of the second resource block is determined based on the resource unit index of the first resource block index, and wherein the resource unit index of the second resource block is determined based on the time unit index of the first resource block index.

The indices of the first resource block and the resource block may be defined by [time unit index, resource unit index], and, when the index of the first resource block is [x, y], the index of the second resource block may be [y, x]. Alternatively, the indices of the first resource block and the resource block may be defined by [time unit index, resource unit index], and, when the index of the first resource block is [x, y], the time unit index of the second resource block may be defined by (y+a) mod number of time units (a being an integer equal to or greater than 0) and the resource unit index of the second resource block may be defined by (x+b) mod number of resource units (b being an integer equal to or greater than 0).

The transmitting the D2D signal via the first resource block may include assigning indices of UEs participating in D2D communication to resource blocks included in the resource structure for D2D communication at the first timing using a resource unit-first method and setting a resource block corresponding to an index of the UE among the resource blocks as the first resource block. In this case, the transmitting the D2D signal via the second resource block may include reading indices of UEs participating in D2D communication at the first timing using a resource unit-first method and assigning the indices of the UEs to resource blocks included in the resource structure for D2D communication at the second timing using a time unit-first method and setting a resource block corresponding to an index of the UE among the resource blocks as the second resource block.

In another aspect of the present invention, provided herein is a user equipment (UE) for performing device-to-device (D2D) communication in a wireless communication system including a wireless communication module configured to transmit and receive a signal to and from a base station or a counterpart UE apparatus of D2D communication, and a processor configured to process the signal, wherein the processor controls the wireless communication module to transmit a D2D signal via a first resource block of a resource structure for D2D communication at a first timing and to transmit the D2D signal via a second resource block of the resource structure for D2D communication at a second timing, and wherein each of the first resource block and the second resource block is defined by a time unit index and a resource unit index, the time unit index of the second resource block is determined based on the resource unit index of the first resource block index, and the resource unit index of the second resource block is determined based on the time unit index of the first resource block index.

Advantageous Effects

According to embodiments of the present invention, it is possible to more efficiently transmit a discovery signal for device-to-device (D2D) communication in a wireless communication system It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

FIGS. 13 and 14 are diagrams showing examples of determining resources to be transmitted in a second discovery resource structure according to an embodiment of the present invention.

BEST MODE

Figure 1:
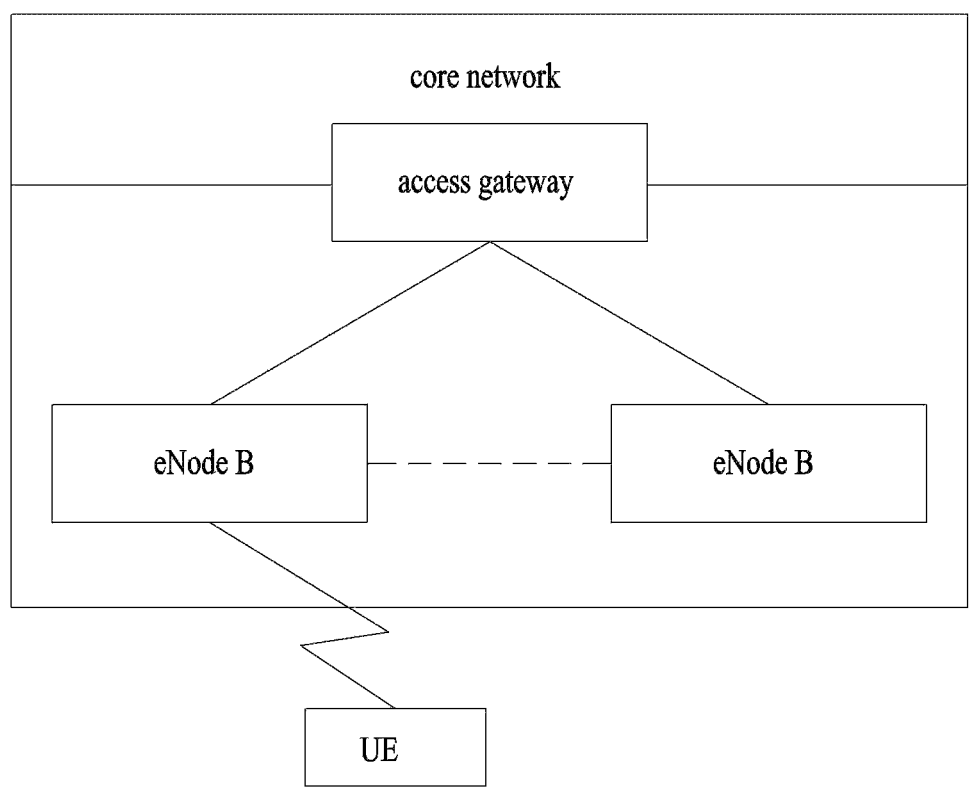
FIG. 1 is a diagram showing a network structure of an Evolved Universal Mobile Telecommunications System (E-UMTS) as an example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
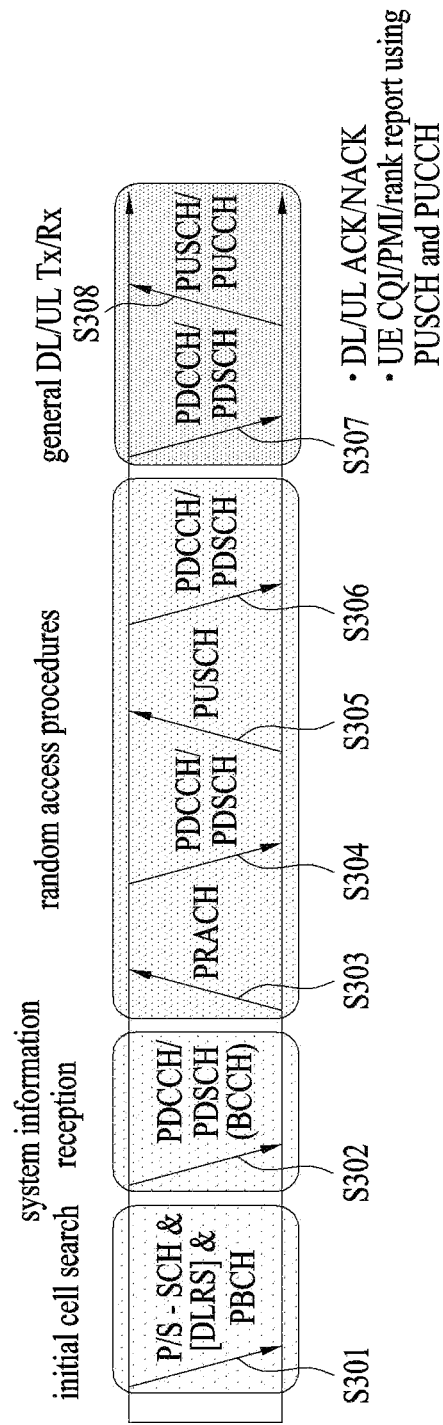
FIG. 3 is a diagram showing physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
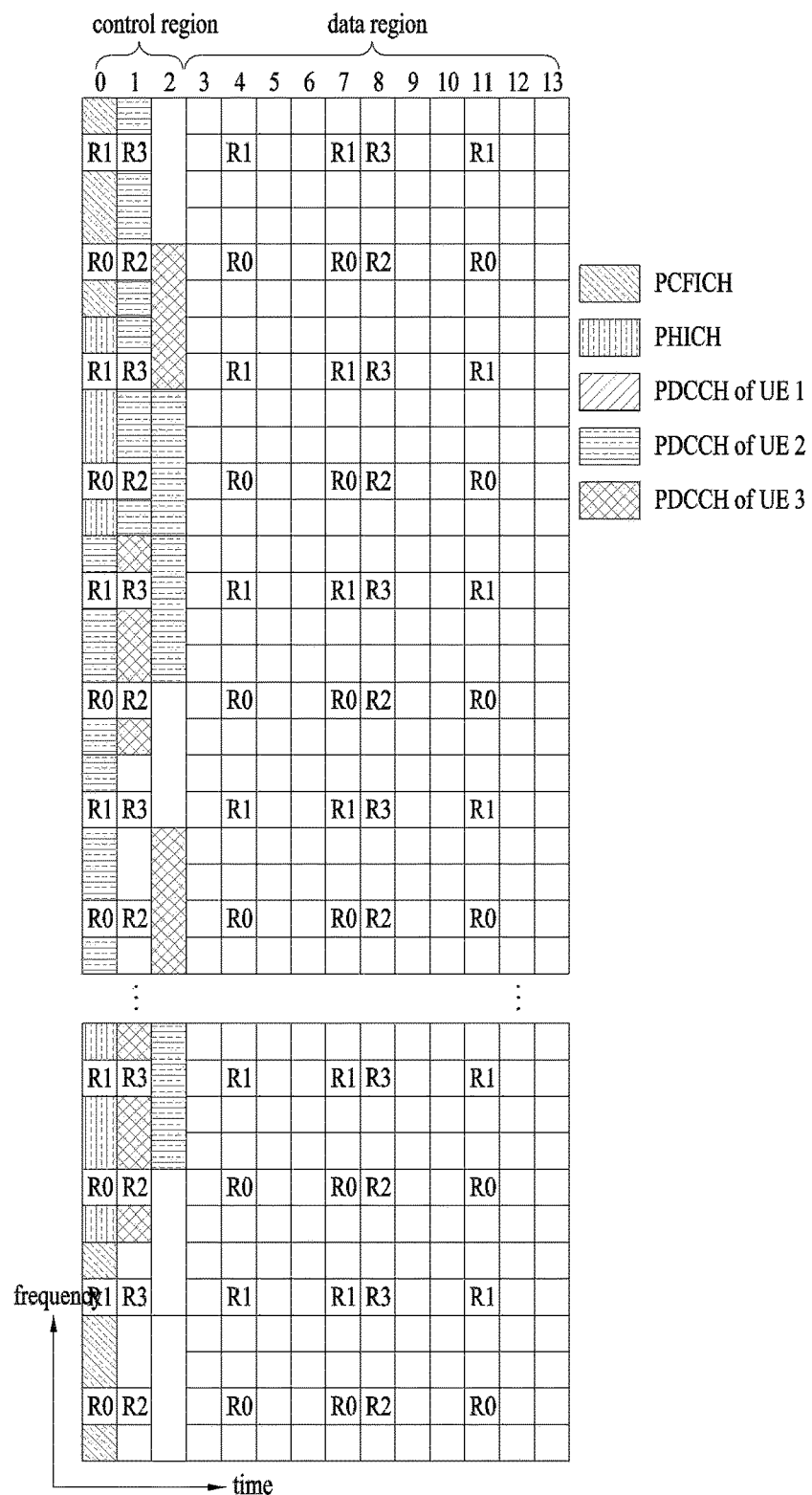
FIG. 4 is a diagram showing the structure of a downlink radio frame used in a Long Term Evolution (LTE) system.

FIG. 4 illustrates exemplary control channels included in a control region of a subframe in a DL radio frame.

Figure 5:
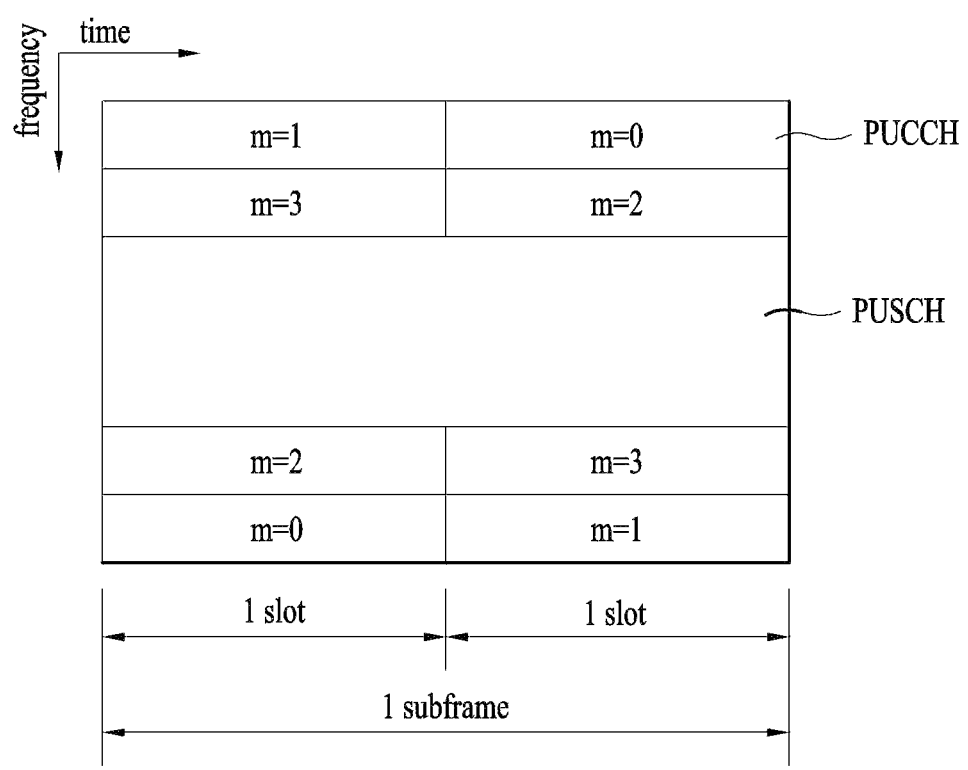
FIG. 5 is a diagram showing the structure of an uplink subframe used in an LTE system.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

A basic resource unit of a DL control channel is an REG. The REG includes four contiguous REs except for REs carrying RSs. A PCFICH and a PHICH include 4 REGs and 3 REGs, respectively. A PDCCH is configured in units of a Control Channel Element (CCE), each CCE including 9 REGs.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
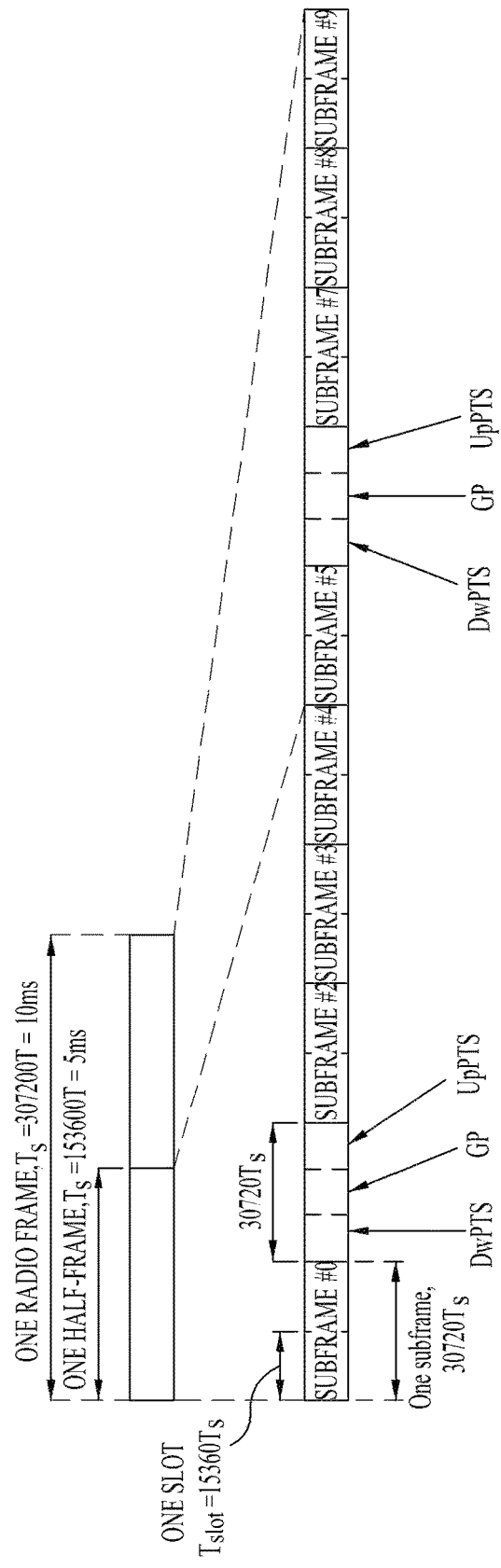
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

In an LTD TDD system, the special subframe is defined as a total of 10 configurations as shown in Table 1.

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | 6592-$T_s$ | | | 7680-$T_s$ | | |
| 1 | 19760-$T_s$ | | | 20480-$T_s$ | | |
| 2 | 21952-$T_s$ | 21952-$T_s$ | 2560-$T_s$ | 23040-$T_s$ | 2192-$T_s$ | 2560-$T_s$ |
| 3 | 24144-$T_s$ | | | 25600-$T_s$ | | |
| 4 | 26336-$T_s$ | | | 7680-$T_s$ | | |
| 5 | 6592-$T_s$ | | | 20480-$T_s$ | | |
| 6 | 19760-$T_s$ | | | 23040-$T_s$ | 4384-$T_s$ | 5120-$T_s$ |
| 7 | 21952-$T_s$ | 4384-$T_s$ | 5120-$T_s$ | 12800-$T_s$ | | |
| 8 | 24144-$T_s$ | | | — | — | — |
| 9 | 13168-$T_s$ | | | — | — | — |

Meanwhile, in an LTE TDD system, a UL/DL configuration is shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2 above, D, U, and S refer to a downlink subframe, an uplink subframe, and the special subframe. In addition, Table 2 also shows downlink-to-uplink switch-point periodicity in an uplink/downlink subframe configuration in each system.

Figure 7:
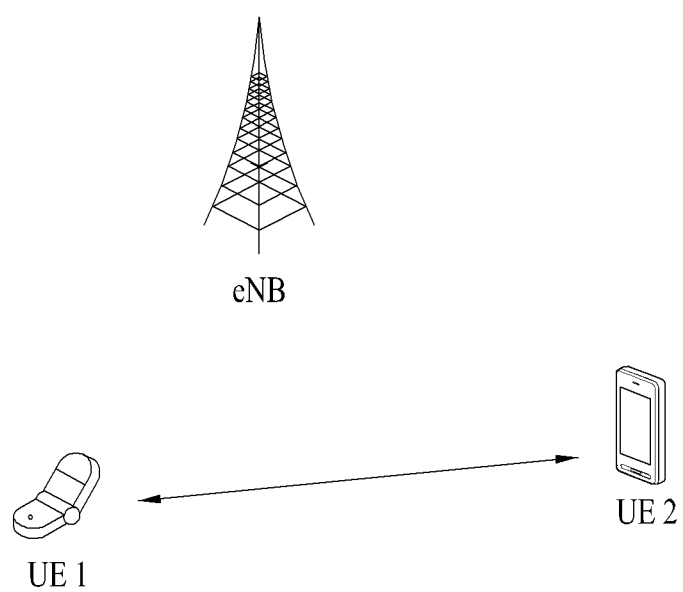
FIG. 7 is a diagram illustrating the concept of device-to-device (D2D) communication.

FIG. 7 is a conceptual diagram illustrating D2D direct communication.

Referring to FIG. 7, during D2D communication (i.e., D2D direct communication) in which the UE wirelessly communicates with another UE, the eNB may transmit a scheduling message for indicating D2D transmission/reception. The UE participating in D2D communication may receive a D2D scheduling message from the eNB, and performs Tx/Rx operations indicated by the D2D scheduling message. Here, although a UE means a user terminal, a network entity such as an eNB may be regarded as a UE when transmitting and receiving a signal according to a communication method between UEs. Hereinafter, a link between UEs is referred to as a D2D link and a link for communication between a UE and an eNB is referred to as an NU link.

In order to perform D2D operation, a UE performs a discovery procedure of determining whether a counterpart UE of D2D communication is located in a D2D communication area. Such a discovery procedure includes transmitting a unique discovery signal for identifying each UE and determining that the UE, which has transmitted the discovery signal, is located at a neighboring position when a neighboring UE detects the discovery signal. That is, each UE determines whether a counterpart UE of D2D communication is located at a neighboring position via the discovery procedure and then performs D2D communication for transmitting and receiving user data.

Such a discovery signal may reuse various signals defined for legacy cellular communication, e.g., a DM-RS for PRACH preamble or PUSCH demodulation in a 3GPP LTE system or an SRS transmitted by a UE for channel state information (CSI) acquisition or may use a new type of signal optimized for discovery.

In the present invention, assume that resources used to transmit the discovery signal are predetermined. For example, an eNB schedules and broadcasts specific time/frequency resources to UEs and each UE transmits and receives a discovery signal using the scheduled time/frequency resources. Preferably, resources used to transmit and receive the discovery signal are not used for general transmission and reception between the eNB and the UE to prevent mutual interference.

Each UE transmits the discovery signal determined according to a predetermined rule using the scheduled resources. When several UEs simultaneously transmit the discovery signals, the rule for determining the discovery signal transmitted by each UE may be determined by parameters such as UE ID in order to distinguish between UEs. For example, the location of the scheduled resources occupied by the discovery signal transmitted by each UE, the signature of the discovery signal, etc. may be determined based on the predetermined rule determined according to UE ID.

Figure 8:
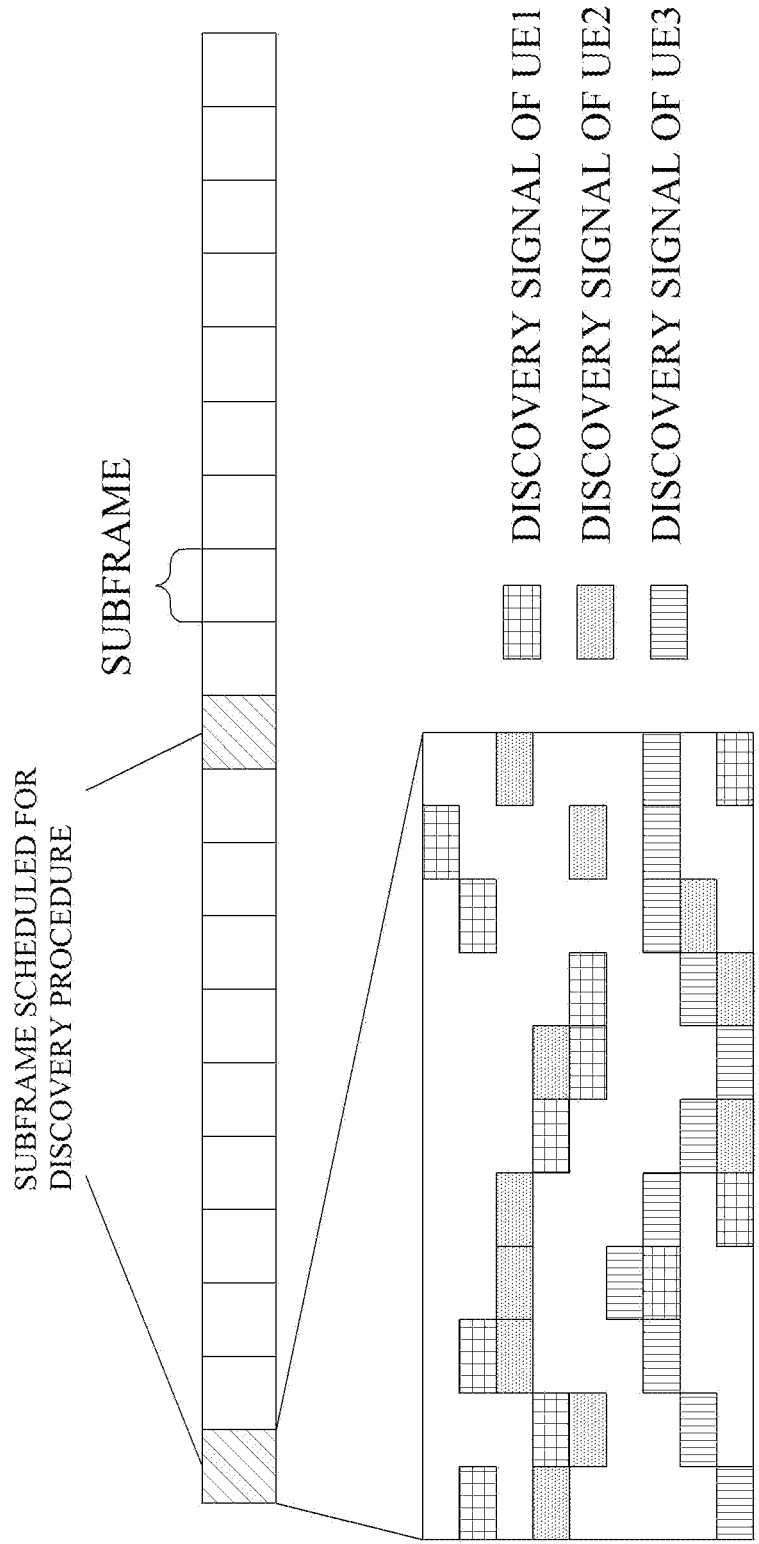
FIG. 8 is a diagram showing an example of periodically assigning subframes to be used as discovery signals.

Hereinafter, on the assumption that the eNB periodically assigns a specific subframe to be used as a discovery signal, detailed operation of the present invention will be described. FIG. 8 is a diagram showing an example of periodically assigning subframes to be used as discovery signals. In some cases, some or all of the discovery signals transmitted by the UEs may overlap. In FIG. 8, although it is assumed that discovery operation is performed in subframe units and discovery subframes are uniformly distributed, the present invention is not limited thereto. That is, a plurality of discovery subframes continuously appears and a pattern of continuously appearing discovery subframes may have a predetermined period. In addition, one discovery subframe may be further divided into a plurality of discovery time units to select transmission and reception of the discovery unit per time unit.

In general, the UE may not simultaneously perform transmission and reception in the same frequency band, because a transmitted signal causes very strong interference with a received signal. Accordingly, when a specific UE transmits a discovery signal in a specific subframe, the discovery signal of another UE may not be received in the specific subframe. When a specific UE desires to receive the discovery signal of another UE while transmitting the discovery signal thereof, the discovery subframe is divided into two subsets to perform the transmission operation of the discovery signal in one subset and to perform the reception operation of the discovery signal in the other subset. When the subset for transmitting the discovery signal by the specific UE is identical to the subset for transmitting the discovery signal by another UE, the two UEs cannot gain an opportunity to detect the mutual discovery signals. As a result, it is impossible to determine whether D2D communication between the two UEs is possible.

In order to solve this problem, the present invention proposes a method of enabling one UE to receive discovery signals of several UEs as soon as possible by appropriately determining whether each UE transmits a discovery signal thereof or receives the discovery signal of another UE in a region specified as resources used to transmit the discovery signal. Hereinafter, assume that one UE performs the same operation (that is, discovery signal transmission or reception) in one discovery time unit.

First, in order to structurally determine a method of determining resources used to transmit a discovery signal by each UE, a discovery resource structure in which a series of UEs performs discovery signal transmission is defined. One discovery resource structure is defined as a group of N discovery time units and N−1 discovery resource units are defined in one discovery time unit. Here, assume that the discovery resource unit means resources distinguishing between different discovery signals and discovery signals using different discovery resources units are distinguished by a reception UE. Different discovery resource units may be distinguished using different frequency resources or different signatures (e.g., spreading code in CDM).

Figure 9:
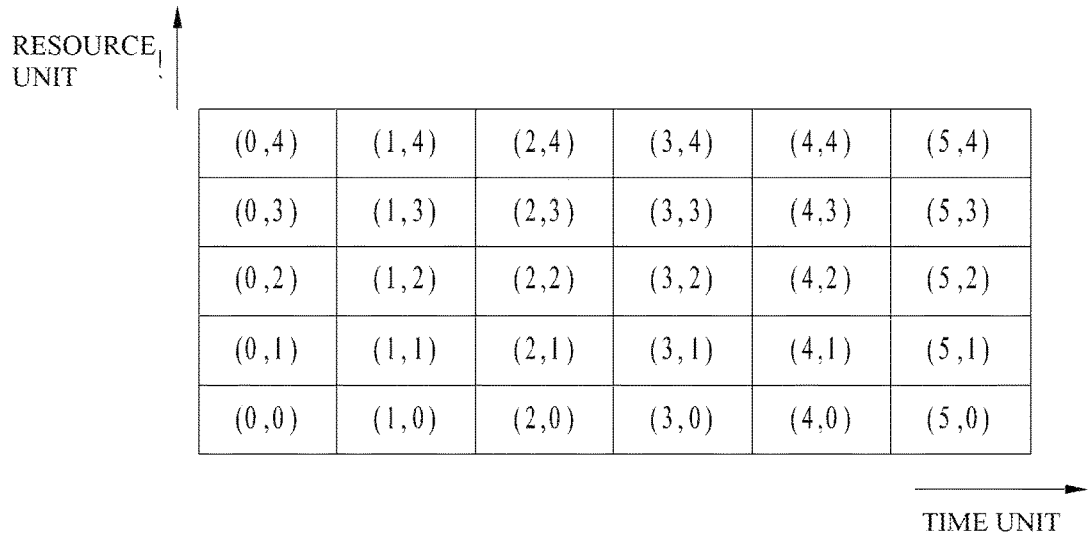
FIG. 9 is a diagram showing a discovery resource structure according to an embodiment of the present invention.

FIG. 9 is a diagram showing a discovery resource structure according to an embodiment of the present invention. In particular, FIG. 9 shows the case of N=6 in which one discovery resource structure includes discovery time units having indices of 0 to 5 and discovery resource units having indices of 0 to 4.

In FIG. 9, a resource unit which is a combination of one discovery time unit and one discovery resource unit is referred to as a discovery block. Each discovery block is represented by (x, y) and x and y respectively denote the index of the discovery time unit and the index of the discovery resource unit.

When a series of UEs transmits discovery signals in one discovery resource structure, the UEs, which have simultaneously transmitted the discovery signals, do not receive mutual discovery signals and thus have an opportunity to transmit the discovery signals using another discovery time unit. This means that one UE performs transmission at least two times in one discovery resource structure. Accordingly, there is a need for an appropriate method of determining the location of the discovery time unit for two discovery signal transmissions of each UE in one discovery resource structure. An example of the method is proposed according to the following principle. Hereinafter, assume that a series of UEs has unique indices in order starting from 0.

1) The index of the discovery time unit is set to 0 and a UE index pointer P is initialized to 0.

2) In discovery time unit #t, discovery resource blocks (t, t), (t, t+1), . . . , (t, N−2) are assigned to UE #P to UE #(P+N−2−t) to give an opportunity to transmit the discovery signal.

3) When a specific UE performs transmission in discovery resource block (x, y), transmission is performed even in discovery resource block (y+1, x).

4) The UE index pointer P is updated to P+N−1−t and t is set to t+1 to move to a next discovery time unit.

5) The method returns to operation 2) to repeat assignment until t=N.

Figure 10:
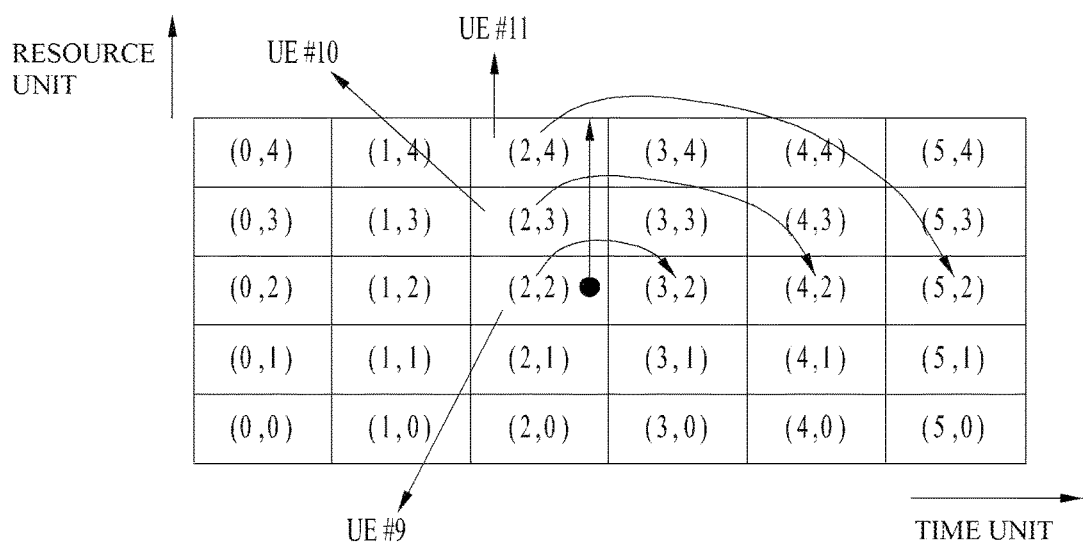
FIG. 10 is a diagram showing an example of determining resources used to transmit a discovery signal according to an embodiment of the present invention.

FIG. 10 is a diagram showing an example of determining resources used to transmit a discovery signal according to an embodiment of the present invention. In particular, FIG. 10 shows operation 2) and 3) in case of t=2 in the discovery resource structure of FIG. 9.

Referring to FIG. 10, first, in discovery time unit #2, discovery resource blocks (2, 2), (2, 3) and (2, 4) are respectively assigned to UE #9, #10 and #11 by operation 2) and discovery resource blocks (3, 2), (4, 2) and (5, 2) are respectively assigned to UE #9, #10 and #11 by operation 3). As a result, UE #9, #10 and #11, which simultaneously perform first transmission in discovery time unit #2, perform second transmission at different timings to gain an opportunity to receive mutual discovery signals.

Figure 11:
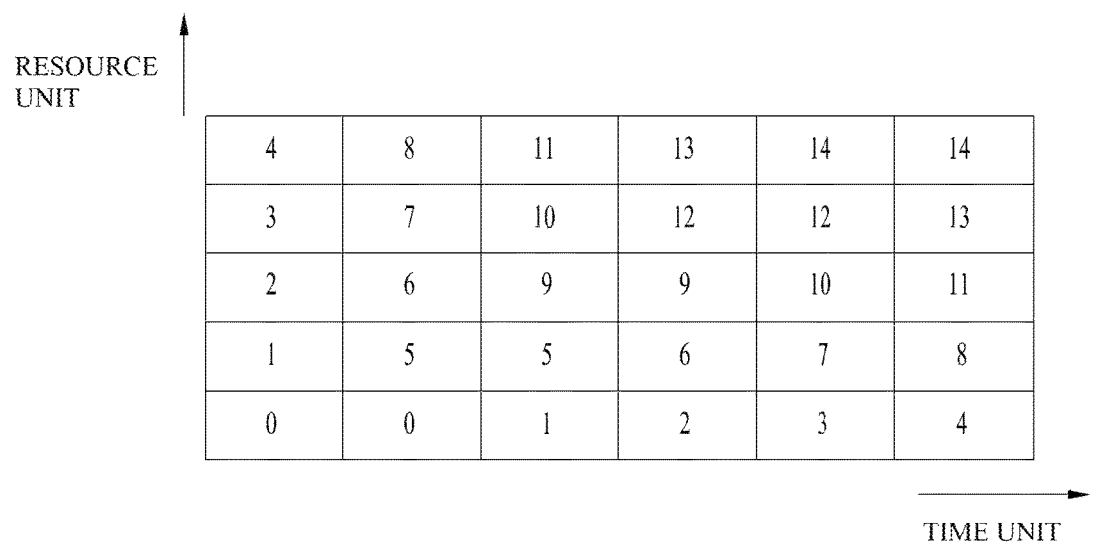
FIG. 11 is a diagram showing a result of assigning resources used to transmit a discovery signal according to an embodiment of the present invention.

FIG. 11 is a diagram showing a result of assigning resources used to transmit a discovery signal according to an embodiment of the present invention. In particular, the numeral of each discovery resource block means the index of the UE to which each discovery resource block is assigned. Referring to FIG. 11, it can be seen that a total of N*(N−1)/2 UEs has an opportunity to transmit the discovery signal twice in one discovery resource structure.

As shown in FIG. 11, it can be seen that some UEs use the same discovery resource unit. In this case, the location of the resource unit may be changed for the purpose of enabling a UE, which receives two discovery signals using the same discovery resource unit, to obtain transmit diversity gain. For example, as shown in FIG. 11, after discovery resource block assignment finishes, the index of the discovery resource unit in each discovery time unit may be readjusted by a predetermined rule.

Figure 12:
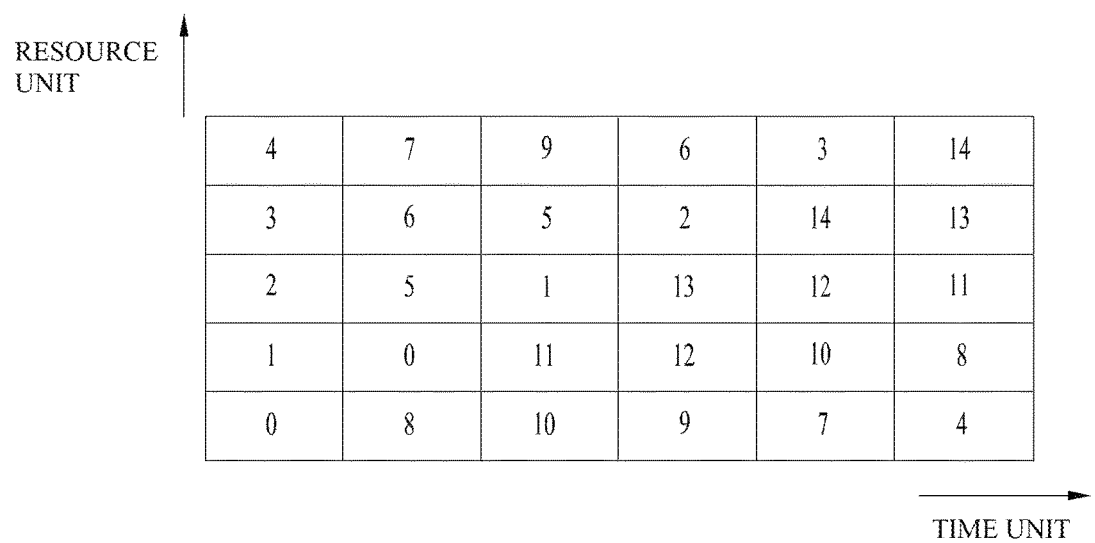
FIG. 12 is a diagram showing an example of readjusting the index of a discovery resource unit in each discovery time unit according to an embodiment of the present invention.

FIG. 12 is a diagram showing an example of readjusting the index of a discovery resource unit in each discovery time unit according to an embodiment of the present invention. In particular, FIG. 12 shows the case in which the index of the resource unit is circularly shifted by t in discovery time unit #t, that is, the case in which the resource unit index r is changed to (r+t) mod (N−1).

The resource unit index may be readjusted using various methods to prevent or suppress one UE from transmitting a discovery signal twice or more in the same resource unit.

In the above-described operations, in particular, in operation 3) of performing transmission even in discovery resource block (y+1, x), when a specific UE performs transmission in discovery resource block (x, y) may be interpreted as reversing the time unit index and the resource unit index of the coordinates of the discovery resource block transmitted at a next timing when a specific UE performs transmission in discovery resource block (x, y) at a previous timing.

Such interpretation is applicable to other discovery resource structures. That is, such interpretation is applicable to the case in which one UE transmits a discovery signal only once in one discovery resource structure and two UEs, which have simultaneously transmitted discovery signals in one discovery resource structure, transmit the discovery signals in different discovery time units in a next discovery resource structure.

For example, if it is assumed that UE1 uses discovery resource block (x, y) in a first discovery resource structure, discovery resource block (y+1, x) is used in a second discovery resource structure. In addition, UE2, which has transmitted a signal in the same discovery time unit as UE1 in the first discovery resource, that is, UE2, which has used discovery resource block (x, z), uses discovery resource block (z+1, x) in the second discovery resource structure. Accordingly, since the resources used by the two UEs in the first discovery resource structure are different, y≠z is satisfied such that different discovery time units are used in the second discovery resource structure. As a result, UE1 and UE2 may receive mutual signals at least in the second discovery resource structure.

Reversing the index of the time resource and the index of the frequency resource when determining resources used for transmission in the second discovery resource structure may be represented by the method of using discovery resource block (x, y) in the first discovery resource structure and using discovery resource block (y+a, x+b) in the second discovery resource structure (a and b being integers equal to or greater than 0). Additionally, in consideration that the number of discovery time units and resource units is restricted in each discovery resource structure, the modulo operation of the two indices of each discovery resource block and the number of discovery time units and resource units may be performed.

FIGS. 13 and 14 are diagrams showing examples of determining resources to be transmitted in a second discovery resource structure according to an embodiment of the present invention.

In particular, FIG. 13 shows a discovery resource block used by each UE over two discovery resource structures when one discovery resource structure is composed of five discovery time units and five resource units. Assume that a and b are 0. In addition, FIG. 14 shows the case in which the modulo operation of the two indices of each discovery resource block and the number of discovery time units and resource units is performed on the assumption that a is 1 and b is 0.

When the number of discovery time units and the number of resource units belonging to one discovery resource structure are not identical, it is difficult to apply the above-described operation without change. This is because some indices may exceed the indices of the discovery time units or resource units in the second discovery resource structure in which the resource unit indices and the time unit indices are reversed.

In this case, when resource block (x, y) is used in the first discovery resource block, (y, x) is used in the second discovery resource structure. In addition, when the discovery resource block (y, x) is not in the range of the discovery resource structure indices, correction operation for moving the discovery resource block (y, x) to a first discovery time unit of a next resource unit index and moving a discovery resource block originally located thereat may be performed.

Figure 15:
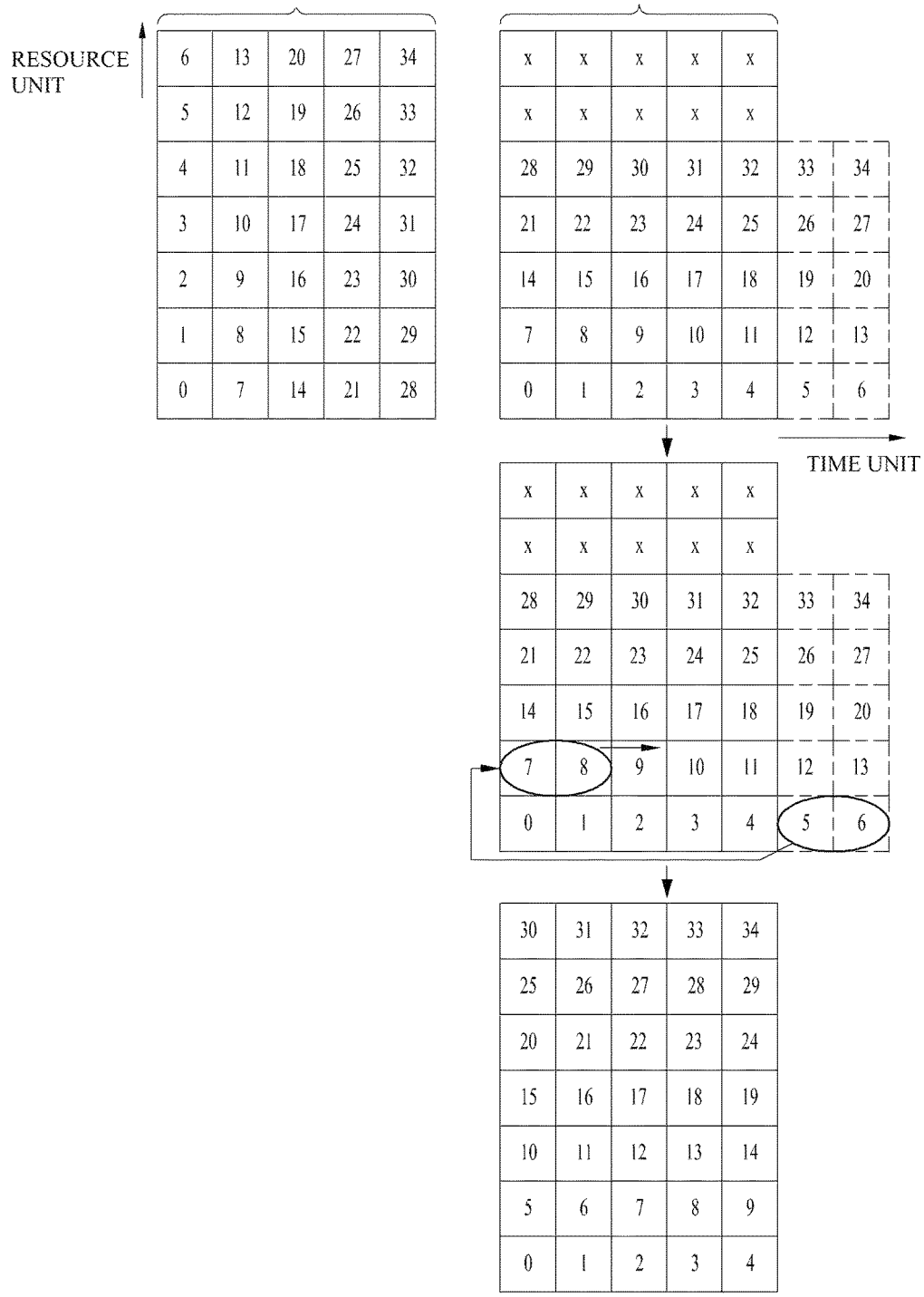
FIG. 15 is a diagram showing correction operation when the number of discovery time units and the number of resource units are not identical according to an embodiment of the present invention.

FIG. 15 is a diagram showing correction operation when the number of discovery time units and the number of resource units are not identical according to an embodiment of the present invention.

Referring to FIG. 15, since discovery resource blocks used by UE5 and UE6 are present outside the discovery resource structure, the discovery resource blocks move to (0, 1) and (1, 1) corresponding to next resource unit indices located in the discovery resource structure and discovery resource blocks used by UE7 and UE8 occupying the resource blocks (0, 1) and (1, 1) move to resource blocks (2, 1) and (3, 1).

By such a correction process, even when the number of discovery time units and the number of resource units are not identical in one discovery resource block, the principle of reversing the time unit indices and the resource unit indices used in the first discovery resource structure to determine the indices of the discovery resource blocks to be used in the second discovery resource structure is applicable.

When the number of UEs increases such that it is difficult to multiplex the UEs in one discovery resource structure, a plurality of discovery resource structures occupying different time and/or frequency resources is defined and then all UEs are divided into groups corresponding in number to the number of discovery resource structures such that each UE group transmits discovery signals using one discovery resource structure.

Figure 16:
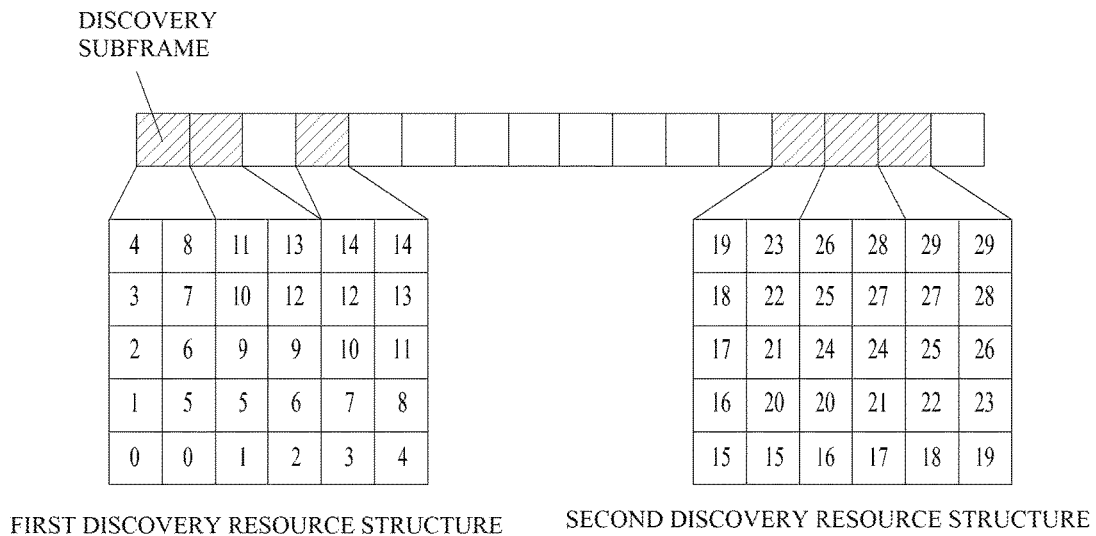
FIG. 16 is a diagram showing an example of assigning resources used for discovery signal per UE group according to an embodiment of the present invention.

FIG. 16 is a diagram showing an example of assigning resources used for discovery signal per UE group according to an embodiment of the present invention. In particular, FIG. 16 shows a method of multiplexing a total of 30 UEs including UE0 to UE29 in case of N=6. In addition, in FIG. 16, assume that two discovery time units are defined in one discovery subframe and two discovery resource structures are defined at different timings. Referring to FIG. 16, UE0 to UE14 transmit discovery signals in a first discovery resource structure and UE15 to UE29 transmit discovery signals in a second discovery resource structure.

In FIG. 16, it can be seen that continuous subframes are assigned as discovery subframes and some subframes are used as general cellular subframes, in order to prevent cellular communication failure from being caused for a long time when too many continuous subframes are used as discovery subframes. This means that the discovery subframes which periodically and repeatedly appear may be discontinuous in one period.

The eNB needs to indicate not only the locations of a series of discovery subframes which periodically appear but also subframes actually assigned as the discovery subframes in each period. In this case, the UE may regard a subframe, which is located between discovery subframes but is not set as a discovery subframe, as being used as a cellular subframe.

Although it is assumed that one discovery resource block is used for one UE to transmit a discovery signal, the principle of the present invention is not limited thereto and is applicable to the case in which a plurality of UEs transmits discovery signals thereof in one discovery resource block. In this case, a plurality of UEs may form one UE group and the UE index according to the principle of the present invention may be replaced with the index of the UE group.

In addition, UEs belonging to one UE group are defined to continuously use the same discovery resource blocks such that an opportunity to receive mutual signals is reduced. In order to solve this problem, a rule of defining a UE group may be differently determined according to the discovery resource structure. For example, a UE ID may be converted into a parameter $Y_m=(A \cdot Y_{m-1})\bmod D$ (Y−1=UE ID) which changes with time and a UE group may be determined based on this parameter. UEs having the same remainder when the parameter $Y_m$ is divided by the total number of UE groups may be grouped into one group. Here, m may indicate the time index and may be represented by the subframe index or the index of the discovery resource structure and A or D corresponds to a predetermined constant.

When UEs transmit discovery signals in some subframes, general UE transmission, e.g., transmission of the PUSCH, PUCCH or SRS to the eNB may be performed using frequency resources different from those of the discovery signal.

Figure 17:
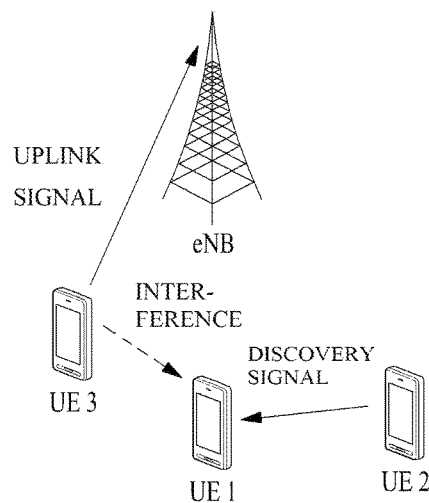
FIG. 17 is a diagram showing an example in which general uplink transmission causes interference with discovery signal transmission and reception.

FIG. 17 is a diagram showing an example in which general uplink transmission causes interference with discovery signal transmission and reception.

Referring to FIG. 17, if neighboring UE3 transmits an existing uplink signal to an eNB when UE1 receives a discovery signal from UE2, the signal transmitted by UE3 strongly interferes with the signal received by UE1. In this case, even when the signal of UE2 and the signal of UE3 are separated in terms of frequency, if interference with UE3 is strong, strong interference is still caused in the UE2 signal received by UE1. In addition, since the power of the signal received by UE1 increases, it is difficult to restore the UE2 signal received with a relatively low level.

In order to prevent this problem, when a specific UE confirms in which subframe a discovery signal is transmitted and received, the transmit power of an uplink subframe transmitted to an eNB in the subframe may decrease to ensure reception performance of the discovery signal. The uplink signal transmitted to the eNB may include some or all of a PUSCH, a PUCCH and an SRS.

Operation for decreasing the transmit power of the uplink signal may be implemented to decrease power by a predetermined ratio to be lower than the transmit power of a general subframe or may be implemented such that maximum transmit power used by the UE in the subframe in which the discovery signal may be transmitted is set to be lower than that of a general subframe. The eNB may deliver information on the location of the subframe via a higher layer signal of an individual UE or some of system information such that each UE confirms which subframe is used to transmit the discovery signal.

Figure 18:
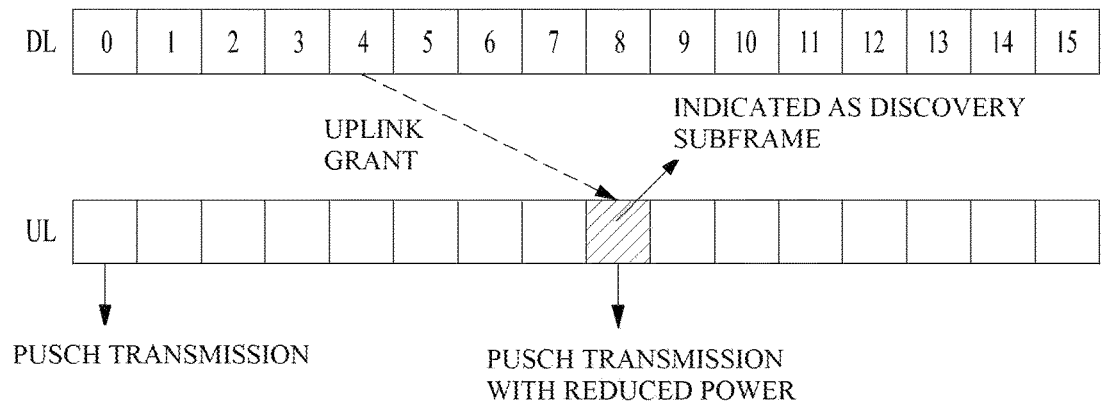
FIG. 18 is a diagram showing an example of operation for decreasing transmit power in a discovery subframe according to an embodiment of the present invention.

FIG. 18 is a diagram showing an example of operation for decreasing transmit power in a discovery subframe according to an embodiment of the present invention. Referring to FIG. 18, when uplink grant is received in subframe #4 and a PUSCH corresponding thereto is transmitted in subframe #8, operation for decreasing transmit power at the UE on the assumption that subframe #8 is set to a discovery subframe is shown.

Figure 19:
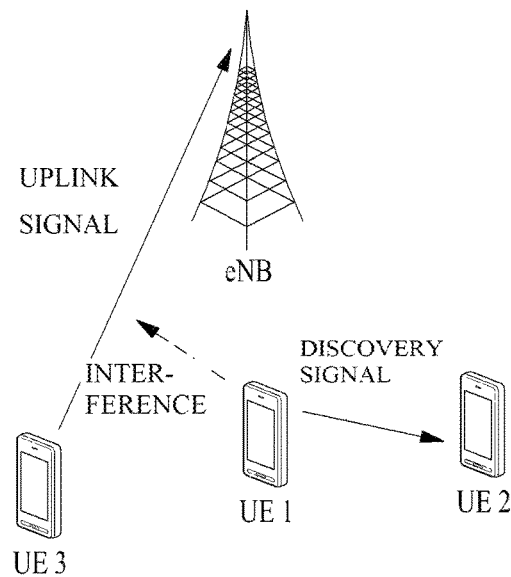
FIG. 19 is a diagram showing an example in which discovery signal transmission causes interference with general uplink transmission.

In contrast, when the discovery signal is transmitted with high power, the discovery signal may cause strong interference with an uplink signal transmitted to the eNB. FIG. 19 shows an example in which transmission of a discovery signal causes interference with general uplink transmission.

In order to overcome this problem, when a UE transmits a signal to an eNB in a subframe set as a discovery subframe, the power of the signal may increase. Here, the uplink signal transmitted to the eNB may include some or all of a PUSCH, a PUCCH and an SRS. In addition, operation for increasing the transmit power of the uplink signal may be implemented to increase the power of the uplink signal by a predetermined ratio to be higher than that of a general subframe or may be implemented such that maximum transmit power used by the UE in the subframe in which the discovery signal may be transmitted is set to be higher than that of a general subframe.

As described above, as a special case of operation for decreasing the transmit power of a general uplink signal in the discovery subframe, the transmit power of some or all general uplink signals in the discovery subframe may be defined to be set to 0. This means that some or all of the general uplink signals are not transmitted in the discovery subframe.

In this case, when the UE sets subframe #n as a discovery subframe, detection of a PHICH and uplink grant indicating PUSCH transmission is preferably skipped in subframe #n-k for scheduling a PUSCH, thereby preventing unnecessary detection errors.

Figure 20:
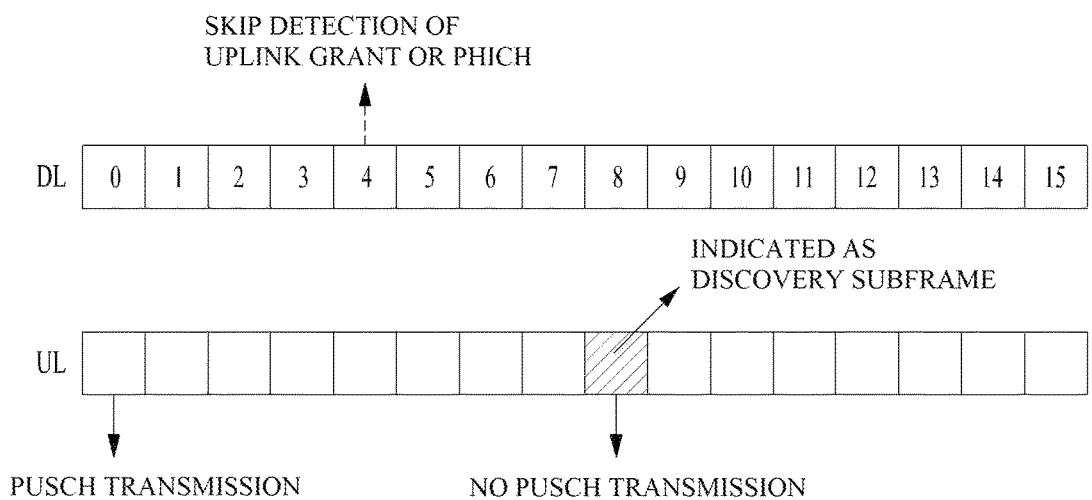
FIG. 20 is a diagram showing an example of skipping detection of uplink grant and PHICH according to an embodiment.

FIG. 20 is a diagram showing an example of skipping detection of uplink grant and PHICH according to an embodiment.

Referring to FIG. 20, after a PUSCH is transmitted in subframe #0, detection of uplink grant and PHICH is skipped in subframe #4 such that PUSCH transmission in subframe #8 set as a discovery subframe is skipped. Here, omission of PHICH detection may mean that a PHICH for delivering HARQ ACK or NACK is not detected and HARQ ACK is always reported to a higher layer such that the higher layer does not indicate retransmission linked thereto.

When PUSCH transmission is skipped by the discovery subframe, the PUSCH to be retransmitted may be interpreted as being moved to next transmission. For example, a PUSCH to be retransmitted in subframe #8 of FIG. 20, that is, the redundancy version (RV) of the PUSCH, may be transmitted in subframe #16. Alternatively, PUSCH transmission may be skipped in subframe #8 and the PUSCH of the RV to be used when transmission is performed in subframe #8 may be transmitted in subframe #16.

In addition, even in the periodically transmitted SRS, transmission may be skipped in the discovery subframe.

Operation for decreasing the transmit power of a general uplink signal or setting the transmit power of the general uplink signal to 0 in the discovery subframe or operation for increasing the transmit power is not limited to the discovery subframe and is applicable to a subframe in which D2D communication for direct communication between UEs is performed.

Figure 21:
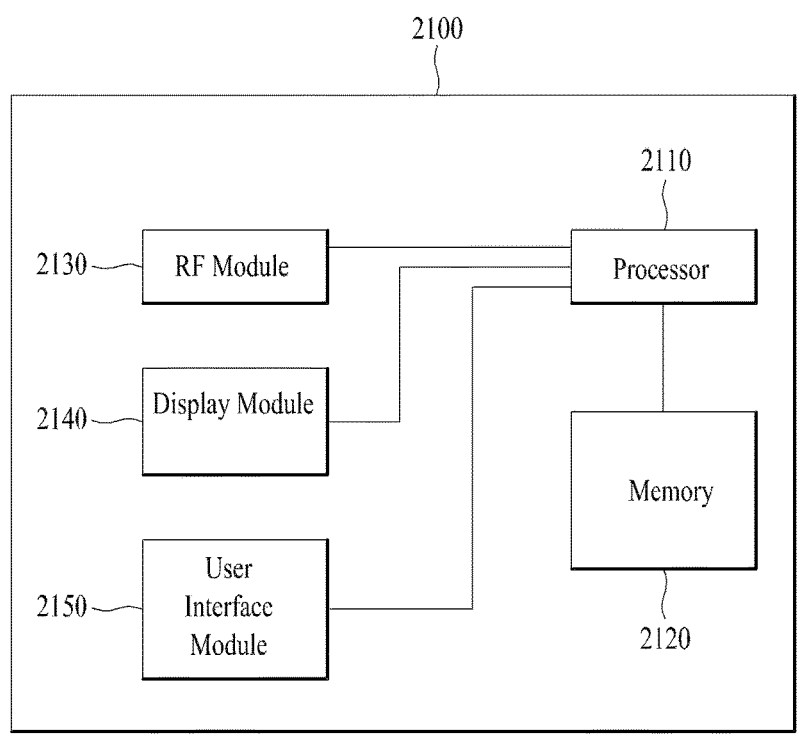
FIG. 21 is a block diagram of a communication apparatus according to an embodiment of the present invention.

FIG. 21 is a block diagram illustrating a communication device according to embodiments of the present invention.

In FIG. 21, the communication device 2100 includes a processor 2110, a memory 2120, a Radio Frequency (RF) module 2130, a display module 2140, and a user interface (UI) module 2150.

The communication device 2100 is disclosed for illustrative purposes only and certain modules may also be omitted from the communication device 2100 as necessary. In addition, the communication device 2100 may further include necessary modules. Some modules of the communication device 2100 may be identified as more detailed modules. The processor 2110 is configured to carry out the operations of the embodiments of the present invention. For detailed operations of the processor 2110 reference may be made to FIGS. 1 to 20.

The memory 2120 is connected to the processor 2110, and stores an operating system, applications, program code, data and the like. The RF module 2130 is connected to the processor 2110 and converts a baseband signal into a radio frequency (RF) signal, or converts the RF signal into the baseband signal. For these operations, the RF module 2130 performs analog conversion, amplification, filtering, and frequency up-conversion in order or performs such operations in reverse order. The display module 2140 is connected to the processor 2110 and displays a variety of information. The scope or spirit of the display module 2140 of the present invention is not limited thereto, and the display module 2140 may be any of well-known elements, for example, a Liquid Crystal Display (LCD), a Light Emitting Diode (LED), an Organic Light Emitting Diode (OLED) and the like. The user interface (UI) module 1450 is connected to the processor 2110, and may be implemented as a combination of user interfaces such as a keypad, a touchscreen, etc.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

INDUSTRIAL APPLICABILITY

Although an example in which a method and apparatus for transmitting a discovery signal for D2D communication in a wireless communication system is applied to a 3GPP LTE system is described, the present invention is applicable to various wireless communication systems in addition to the 3GPP LTE system.

The invention claimed is:

1. A method of transmitting a discovery signal for a device-to-device (D2D) communication at a user equipment (UE) in a wireless communication system, the method comprising:
    transmitting the discovery signal via an (i)-th resource block of a resource structure at an (i)-th period,
    wherein (i) is a natural number; and
    transmitting the discovery signal via an (i+1)-th resource block of the resource structure at an (i+1)-th period,
    wherein each of the (i)-th resource block and the (i+1)-th resource block is defined by a time unit index and a frequency unit index, and
    wherein an equation for determining the time unit index of the (i+1)-th resource block has a variable corresponding to the frequency unit index of the (i)-th resource block, and the time unit index of the (i+1)-th resource block is determined regardless of a variable corresponding to the time unit index of the (i)-th resource block, when a number of frequency units and a number of time units in the resource structure are the same.

2. The method according to claim 1, wherein:
the indices of the (i)-th resource block and the (i+1)-th resource block are defined by [time unit index, frequency unit index], and
when an index of the (i)-th resource block is [x, y], the index of the (i+1)-th resource block is [y, x].

3. The method according to claim 1, wherein:
the indices of the (i)-th resource block and the (i+1)-th resource block are defined by [time unit index, frequency unit index], and
when the index of the (i)-th resource block is [x, y], the time unit index of the (i+1)-th resource block is defined by y mod a number of time units in the resource structure, and the frequency unit index of the (i+1)th resource block is defined by x mod a number of frequency units in the resource structure.

4. The method according to claim 1, wherein:
the indices of the (i)-th resource block and the (i+1)-th resource block are defined by [time unit index, frequency unit index], and
when the index of the (i)-th resource block is [x, y], the time unit index of the (i+1)-th resource block is defined by (y+a) mod a number of time units in the resource structure, and the frequency unit index of the (i+1)-th resource block is defined by (x+b) mod a number of frequency units in the resource structure, and
a and b are integers equal to or greater than 0.

5. A user equipment (UE) for performing device-to-device communication in a wireless communication system, the UE comprising:
    a radio frequency (RF) transceiver configured to transmit and receive signals to and from a base station or a target UE in device-to-device communication; and
    a processor, connected to the RF transceiver to process the signal,
    wherein the processor controls the RF transceiver to transmit a discovery signal via an (i)-th resource block of a resource structure at an (i)-th period and transmit the discovery signal via an (i+1)-th resource block of the resource structure at an (i+1)-th period,
    wherein (i) is a natural number,
    wherein each of the (i)-th resource block and the (i+1)-th resource block is defined by a time unit index and a frequency unit index, and
    wherein the processor determines the time unit index of the (i+1)-th resource block based on an equation having a variable corresponding to the frequency unit index of the (i)-th resource block, and the time unit index of the (i+1)-th resource block is determined regardless of the time unit index of the (i)-th resource block, when a number of frequency units and a number of time units in the resource structure are the same.

6. The UE according to claim 5, wherein:
the indices of the (i)-th resource block and the (i+1)-th resource block are defined by [time unit index, frequency unit index], and
when the index of the (i)-th resource block is [x, y], the processor determines the index of the (i+1)-th second resource block as [y, x].

7. The UE according to claim 5, wherein:
the indices of the (i)-th resource block and the (i+1)-th resource block are defined by [time unit index, frequency unit index], and
when the index of the (i)-th resource first resource block is [x, y], the processor determines the time unit index of the (i+1)-th resource block as y mod a number of time units in the resource structure, and determines the frequency unit index of the (i+1)-th resource block as x mod a number of frequency units in the resource structure.

8. The UE according to claim 5, wherein:
the indices of the (i)-th resource block and the (i+1)-th resource block are defined by [time unit index, frequency unit index], and
when the index of the (i)-th resource block is [x, y], the processor determines the time unit index of the (i+1)-th resource block as (y+a) mod a number of time units in the resource structure, and determines the frequency unit index of the (i+1)-th resource block as (x+b) mod a number of frequency units in the resource structure, and
a and b are integers equal to or greater than 0.

* * * * *